US012748201B2

(12) United States Patent
Hustava et al.

(10) Patent No.: US 12,748,201 B2
(45) Date of Patent: Sep. 29, 2026

(54) SELF-CLEANING ULTRASONIC SENSORS

(71) Applicant: SEMICONDUCTOR COMPONENTS INDUSTRIES, LLC, Scottsdale, AZ (US)

(72) Inventors: Marek Hustava, Bratislava (SK); Jiri Kantor, Hrusky (CZ)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 99 days.

(21) Appl. No.: 18/806,582

(22) Filed: Aug. 15, 2024

(65) Prior Publication Data

US 2025/0244455 A1 Jul. 31, 2025

Related U.S. Application Data

(60) Provisional application No. 63/626,354, filed on Jan. 29, 2024.

(51) Int. Cl.
*G01S 7/52* (2006.01)
*G01S 7/524* (2006.01)
(Continued)

(52) U.S. Cl.
CPC .......... *G01S 7/52004* (2013.01); *G01S 7/524* (2013.01); *G01S 7/526* (2013.01); *G01S 15/931* (2013.01); *G01S 2007/52011* (2013.01)

(58) Field of Classification Search
CPC .... G01S 7/52004; G01S 15/931; G01S 7/526; G01S 7/524; G01S 2007/52011;
(Continued)

(56) References Cited

U.S. PATENT DOCUMENTS

| | | | |
|---|---|---|---|
| 10,557,938 | B2 | 2/2020 | Guenzel et al. |
| 11,269,067 | B2 | 3/2022 | Kutej et al. |

(Continued)

FOREIGN PATENT DOCUMENTS

| | | | | |
|---|---|---|---|---|
| DE | 201310011186 | A1 | 1/2014 | |
| DE | 102013211419 | A1 * | 12/2014 | ........... G01S 15/931 |
| DE | 102015211710 | A1 * | 12/2016 | ......... G01S 7/52004 |

OTHER PUBLICATIONS

DE-102013211419-A1 (Machine Translation) (Year: 2014).*

(Continued)

*Primary Examiner* — Yuqing Xiao
*Assistant Examiner* — Christopher Richard Walker
(74) *Attorney, Agent, or Firm* — Ramey LLP

(57) ABSTRACT

Ultrasonic sensors, sensor controllers, and sensor control methods are provided with self-cleaning functionality. An illustrative method includes: driving a piezoelectric transducer to generate a short acoustic burst for obstacle detection or distance measurement; obtaining a receive signal to monitor for reflections of the short acoustic burst; and operating to clean the sensor by driving the piezoelectric transducer to generate a long acoustic burst at a resonant frequency of the piezoelectric transducer. The method may be implemented by a sensor controller having a transmitter configured to drive the piezoelectric transducer, a receiver coupled to the piezoelectric transducer and a microphone to detect a reflection of the acoustic burst within a measurement interval associated with the acoustic burst; and a microcontroller configured to control a length of the acoustic burst. The sensor controller may be incorporated into a sensor that also includes a piezoelectric transducer and optionally includes one or more microphones.

18 Claims, 4 Drawing Sheets

(51) Int. Cl.
*G01S 7/526* (2006.01)
*G01S 15/931* (2020.01)

(58) Field of Classification Search
CPC ........... G01S 2015/932; G01S 19/0423; G01S 7/5273; G01S 7/5276; B06S 1/56; G05B 19/0423
USPC ............................................................ 367/13
See application file for complete search history.

(56) References Cited

U.S. PATENT DOCUMENTS

| | | | |
|---|---|---|---|
| 11,885,874 B2 | 1/2024 | Hustava et al. | |
| 2015/0090291 A1 | 4/2015 | Na et al. | |
| 2018/0081055 A1* | 3/2018 | Guenzel | G01S 7/52001 |
| 2019/0242985 A1 | 8/2019 | Ishii et al. | |
| 2021/0132204 A1 | 5/2021 | Caspall | |
| 2024/0255600 A1 | 8/2024 | Hustava | |
| 2025/0056164 A1 | 2/2025 | Littrell | |
| 2025/0110225 A1* | 4/2025 | White | G01S 7/52004 |

OTHER PUBLICATIONS

DE-102015211710-A1 (Machine Translation) (Year: 2016).*
Displacido et al. ("Enhancement of ultrasonic de-icing via tone burst excitation." Journal of Aircraft 53.6 (2016): 1821-1829, "Displacido") (Year: 2016).*

* cited by examiner

SELF-CLEANING ULTRASONIC SENSORS

CROSS-REFERENCE TO RELATED APPLICATIONS

The present application claims benefit of Provisional U.S. Application 63/626,354 filed 2024 Jan. 29 and titled "Weather immune ultrasonic sensor" by inventors Marek Hustava and Jiri Kantor. This provisional application is hereby incorporated herein by reference in its entirety.

The present application also relates to commonly owned U.S. patent application Ser. No. 18/468,207 filed 2023 Sep. 15 titled "Sensor array module for an advanced driver assistance system" by inventor Marek Hustava, which claims benefit of Provisional U.S. Application 63/482,193 filed 2023 Jan. 30. This commonly-owned application is hereby incorporated herein by reference.

BACKGROUND

As explained in, e.g., co-owned U.S. Pat. No. 11,269,067 filed 2018 Feb. 5 and titled "Response-based determination of piezoelectric transducer state" by inventors Jiri Kutej et al., which is incorporated herein by reference in its entirety, modern automobiles are equipped with an impressive number and variety of sensors. For example, cars are now routinely equipped with arrays of ultrasonic sensors to monitor the distance between the car and any nearby persons, pets, vehicles, or obstacles. Due to environmental "noise" and safety concerns, each of the sensors may be asked to provide tens of measurements each second while the car is in motion. It is important for such sensor arrays to perform reliably or to alert the operator when their performance is suspect.

As the number of sensors increases, so too does the incidence rate of sensor failures and the importance of correctly diagnosing such failures so that the operator can be alerted and, if needed, suitable action can be taken to correct or accommodate the failure. Illustrative actions may include: repairing a broken or disconnected transducer, washing the car to remove mud or dirt from the sensor's surface, exercising caution while the transducer is impaired by snow or rain, and just ignoring a transient noise event when the sensor is otherwise operating correctly. Previously mentioned U.S. Pat. No. 11,269,067 describes techniques for diagnosing such failures.

Failures such as pollution/obstruction of the sensor, for example a coating of dirt, mud, snow, or ice over the sensor's lens, antenna, surface, membrane, or port hole. For some sensors, internal condensation may also present a problem. Ideal performance occurs only with clean or unobstructed sensors. Various sensor cleaning techniques have accordingly been developed, but generally require significant additional manufacturing cost. Examples include: jets of high pressure air, water, or mist; ultrasonic cleaning; heating; and mechanisms to prevent contamination by hiding the sensor when not in use.

Perhaps due to the added manufacturing costs, existing ultrasonic sensing systems typically are not provided with such sensor cleaning techniques. At least some systems detect when a given ultrasonic sensor is obstructed and ignore the associated sensor measurement results while the sensor remains obstructed. The sensor may continue to operate, but internal diagnostics monitor for sensor impairments. The sensor controller attaches the diagnostic result to the measurement data, providing a stamp or flag to indicate whether the sensor is obstructed. The electronic control unit (ECU) omits unreliable measurement data from the distance measurement process to ensure the system is not fooled by invalid measurement data. Of course, the omission of measurements degrades overall system performance. Vulnerability to dirt and other obstructions is accordingly a limiting factor for ultrasonic sensors.

SUMMARY

Accordingly, there are disclosed herein various sensors, sensor controllers, and sensor control methods with self-cleaning functionality. An illustrative method includes: driving a piezoelectric transducer to generate a short acoustic burst for obstacle detection or distance measurement; obtaining a receive signal to monitor for reflections of the short acoustic burst; and operating to clean the sensor by driving the piezoelectric transducer to generate a long acoustic burst at a resonant frequency of the piezoelectric transducer. The method may be implemented by a sensor controller having a transmitter configured to drive the piezoelectric transducer, a receiver coupled to at least one of the piezoelectric transducer and a microphone to detect a reflection of the acoustic burst within a measurement interval associated with the acoustic burst; and a microcontroller configured to control a length of the acoustic burst. The sensor controller may be incorporated into a sensor that also includes a piezoelectric transducer and optionally includes one or more microphones.

The foregoing method, sensor controller, and sensor may be employed individually or together, and they may further employ one or more of the following optional features in any suitable combination: 1. the longer burst length fully occupies the measurement interval with driven vibration or residual ring down vibration. 2. the measurement interval is greater than 50 ms. 3. the microcontroller sets the length of the acoustic burst less than or equal to 4 ms when operating to detect the reflection. 4. the transmitter drives the transducer at a resonant frequency for the length of the acoustic burst when operating to clean the sensor. 5. the transmitter drives the transducer at above or below the resonant frequency when operating to detect the reflection. 6. the transmitter drives the transducer with a drive current greater than or equal to 400 milliamps when operating to clean the sensor. 7. the microcontroller employs the longer acoustic burst length for multiple consecutive measurement intervals when operating to clean the sensor. 8. when operating to clean the sensor, the microcontroller repeatedly employs the longer acoustic burst length until the sensor controller reaches a target temperature. 9. when operating to clean the sensor, the microcontroller resumes employing the longer acoustic burst length after the sensor controller returns from the target temperature to a lower temperature threshold. 10. the sensor controller heats a microphone port to clear away ice. 11. when operating to clean the sensor the sensor controller heats the piezoelectric transducer without relying on a heater. 12. the microcontroller is configured to monitor for sensor impairment and is configured to automatically begin operating to clean the sensor after detecting sensor impairment.

DETAILED DESCRIPTION

The following description and accompanying drawings are provided for explanatory purposes and do not limit the disclosure. In other words, they provide the foundation for one of ordinary skill in the art to recognize and understand all modifications, equivalents, and alternatives falling within the scope of the claims, and do not set forth any implicit limitations for the scope of the claims.

Figure 1:
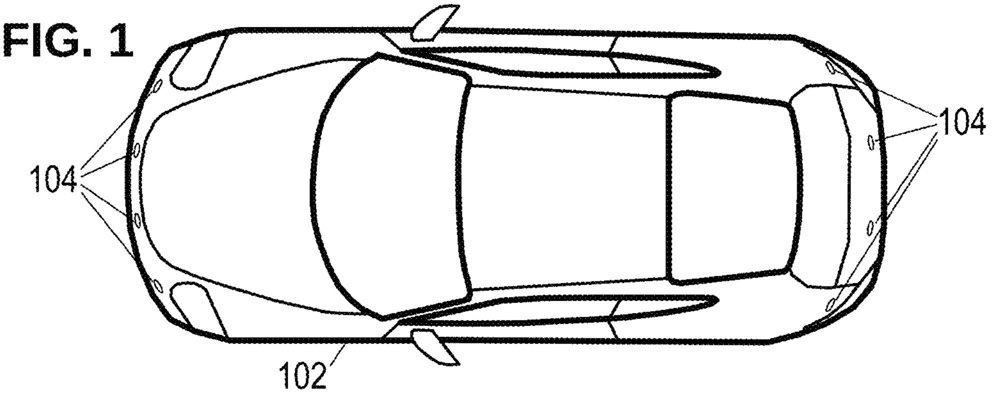
FIG. 1 is an overhead view of an illustrative vehicle equipped with parking-assist sensors.

FIG. 1 shows an illustrative vehicle 102 equipped with a set of ultrasonic parking-assist sensors 104. The number and configuration of sensors in the sensor arrangement varies, and it would not be unusual to have four sensors on each bumper with two additional sensors on each side for blind-spot detectors on each side. The vehicle may employ the sensor arrangement for detecting and measuring distances to objects in the various detection zones, using the sensors for individual measurements as well as cooperative (e.g., triangulation, multi-receiver) measurements.

The ultrasonic sensors are transceivers, meaning that each sensor can transmit and receive bursts of ultrasonic sound. Emitted acoustic bursts propagate outward from the vehicle until they encounter and reflect from an object or some other form of acoustic impedance mismatch. The acoustic burst reflections return to the vehicle as "echoes" of the emitted bursts. The times between the emitted acoustic bursts and received echoes are indicative of the distances to the reflection points. In many systems, only one sensor transmits at a time, though all the sensors may be configured to measure the resulting echoes. However, multiple simultaneous transmissions can be supported through the use of orthogonal waveforms or transmissions to non-overlapping detection zones.

Figure 2:
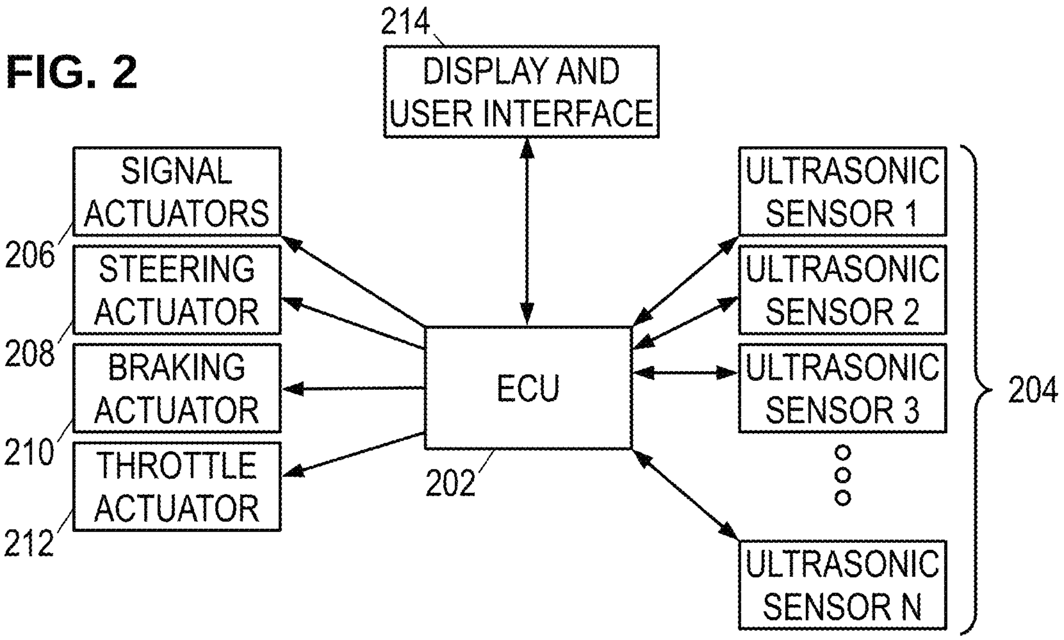
FIG. 2 is a block diagram of an illustrative parking assist system.

FIG. 2 shows an electronic control unit (ECU) 202 coupled to the various ultrasonic sensors 204 as the center of a star topology. Of course, other topologies including serial, parallel, and hierarchical (tree) topologies, are also suitable and contemplated for use in accordance with the principles disclosed herein. To provide automated parking assistance, the ECU 202 may further connect to a set of actuators such as a turn-signal actuator 206, a steering actuator 208, a braking actuator 210, and throttle actuator 212. ECU 202 may further couple to a user-interactive interface 214 to accept user input and provide a display of the various measurements and system status. Using the interface, sensors, and actuators, ECU 202 may provide automated parking, assisted parking, lane-change assistance, obstacle and blind-spot detection, and other desirable features. Though only one ECU is shown in FIG. 2, many systems may distribute ECU tasks among multiple interconnected ECUs.

Figure 3:
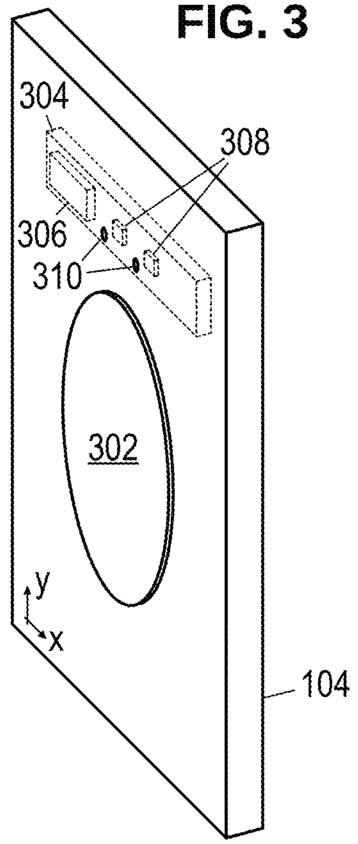
FIG. 3 is a perspective view of an illustrative parking-assist sensor.

FIG. 3 is an isometric view of an illustrative sensor 104 having an ultrasonic transducer 302, which may include a piezoelectric element with supporting components to configure the transducer's resonance frequency and resonance peak width. In the case of a concealed sensor the ultrasonic transducer 302 may contact the backside of an overlying surface. Alternatively, the ultrasonic transducer 302 may be positioned behind an aperture or acoustically transparent window in the overlying surface. Where aesthetics permit, the ultrasonic transducer 302 may be mounted externally or otherwise left exposed to view. The ultrasonic transducer 302 generates an acoustic burst when driven and may be configured to sense reflections of the acoustic burst from objects within sensing range.

Sensor 104 further includes a substrate 304 such as a PCB (printed circuit board) or MLO (multilayer organic) laminate with the control electronics for the sensor assembly. Mounted on the substrate 304 is a sensor controller 306 and one or more optional microphones 308. The microphones 308 may be dies with a microelectromechanical system (MEMS) structure for acoustic sensing. To enhance sensitivity, the microphones 308 may be aligned with corresponding holes 310 in the sensor casing and, where the sensor is concealed, aligned with an unobtrusive opening or acoustic window in the overlying surface. Alternatively, the sensor 104 may position the microphones 308 near an edge of the overlying surface or on a side of the surface around a corner from the ultrasonic transducer 302 where the microphones can be sensitive to acoustic signals without being obtrusive.

In some contemplated sensor configurations, at least one MEMS microphone 308 is displaced vertically from the ultrasonic transducer 302 and may operate cooperatively with the transducer 302 to enable direction of arrival (DoA) detection from which the reflector's elevation angle may be estimated. Alternatively, two vertically spaced microphones 308 can be used for this purpose. In a similar fashion, a second MEMS microphone may be displaced horizontally from the ultrasonic transducer or from the first MEMS microphone to enable estimation of the reflector's azimuthal angle. Some contemplated sensor assemblies have multiple MEMS microphones that provide a horizontal and a vertical displacement relative to the transducer or to each other, enabling estimation of both elevation and azimuthal angles.

Figure 4:
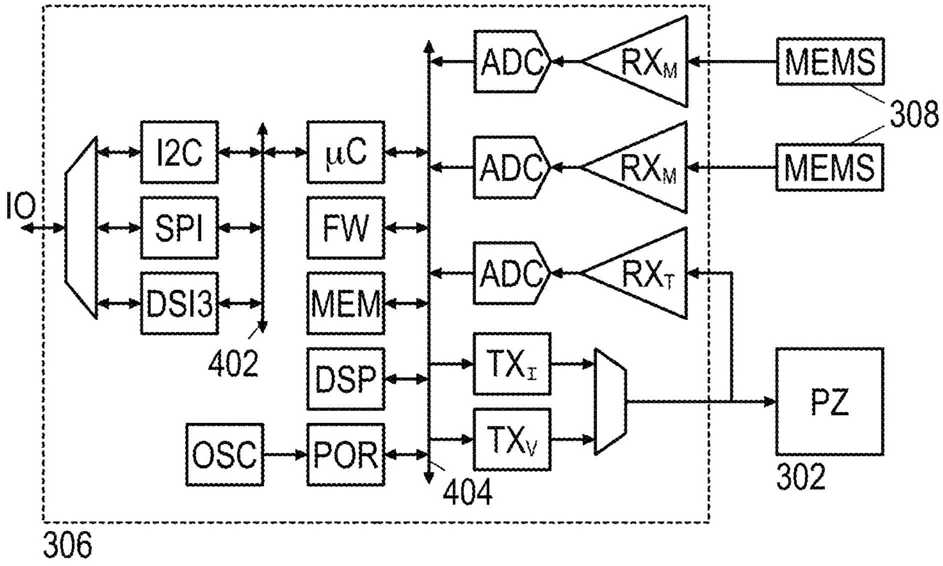
FIG. 4 is a block diagram of an illustrative parking-assist sensor.

FIG. 4 is a block diagram of an illustrative sensor controller 306. It employs IO (input and output) pins that are multiplexed to a selected one of various IO protocol modules. Modules are shown for the I2C (inter-integrated circuit), SPI (serial peripheral interface), and DSI3 (3rd generation of distributed systems interface) communications bus protocols, but these are just nonlimiting examples. Other contemplated protocols include those set forth in the LIN, CAN, and SENT standards. An IO bus 402 couples the various IO protocol modules to an embedded microcontroller (μC). An AMBA (advanced microcontroller bus architecture) bus 404 such as, e.g., an AMB-Lite (simplified advanced high-performance bus), may be used to couple the embedded microcontroller to various other functional blocks of the sensor controller 306. Such blocks may include, e.g., a nonvolatile firmware (FW) memory, a volatile working memory (MEM), a digital signal processor (DSP), a power-on reset (POR) module, an ADC (analog to digital converter) for each microphone signal receiver ($RX_M$), an additional ADC for a transducer signal receiver ($RX_T$), a drive-current transmitter ($TX_I$), and a drive-voltage transmitter ($TX_V$). (The transmitters generate the drive signal for the ultrasonic transducer as a controlled current or controlled voltage, respectively.) A multiplexer may couple a selected one of the transmitters to output pins for driving the ultrasonic transducer 302. FIG. 4 further shows an embedded oscillator (OSC) that generates one or more clock signals for the various other blocks, optionally including a carrier frequency for the transmitters and receivers. The POR module may control distribution of the clock signals to enable a sleep mode for unneeded components and other power saving features.

The IO pins couple the sensor controller 306 directly or indirectly (e.g., via a DSI3 bus master) to an ECU (electronic control unit). The ECU may communicate commands to each of the sensor controllers to, e.g., set values for the sensors' various configuration parameters, to initiate transmission of acoustic bursts, and to collect signal data or other measurement results. The microprocessor in each sensor controller operates in accordance with firmware and stored configuration parameters to parse commands from the ECU and carry out the appropriate operations, including the transmission of acoustic bursts and reception of acoustic signals.

In various implementations, use is made of chirp-modulated signals, for instance a linear frequency modulated ("LFM") chirp. A chirp is a pulse that changes frequency during transmission. An up-chirp is a signal pulse that increases in frequency during transmission, and a down-chirp is a signal pulse that decreases in frequency during transmission. For clarity, the examples used herein will consider a linear increase or decrease, however in various implementations the increase or decrease is not linear. The echo of a chirp may be compressed in a correlator without introducing much or any correlation noise. As such, peak detection of the echo is eased without decreasing time resolution. Additionally, LFM chirps withstand Doppler frequency shift without, or with a minimum of, any increase in correlation noise. LFM chirps can be used as transmit pulses for measuring a distance and direction to an obstacle, or object, situated in the sensing range of a sensor system.

In other implementations, use is made of AM (amplitude-modulated) signals, for instance a shaped pulse of a fixed-frequency carrier. AM signaling mode may enable the use of shorter bursts (e.g., on the order of 200 to 300 microseconds), reducing transmission time and increasing sensitivity to nearby obstacles. Other implementations may employ pulses with modulated carriers, e.g., modulated with binary phase shift keying (BPSK). For sake of clarity, the term "burst" as used herein refers to an AM (fixed frequency), BPSK (modulated), or chirp (swept frequency) pulse, which may be one of a series of bursts created by driving a piezoelectric element or other ultrasonic transducer. Chirp-modulated pulses may have a longer duration than a typical AM pulse, for instance more than 1 millisecond, such as in the range of 2-3 milliseconds. It is noted here that burst lengths can be varied, with shorter bursts being used to facilitate detection of nearby obstacles and longer bursts being used to increase burst energy (and echo energy) for more distant obstacles. Burst lengths for detecting nearby obstacles may be half or perhaps a quarter of the burst lengths used for more distant obstacles. The sensor may be switched between modes for different detection distances.

Although it is deemed particularly useful to systematically vary a characteristic frequency (e.g., the starting frequency or, equivalently, the center or ending frequency) of the chirp-modulated pulses in a series, such frequency variation can also be applied to the carrier frequency of the AM pulses in a series. The frequency variation can be expressed for each pulse as a frequency displacement from a nominal characteristic frequency (e.g., a nominal starting frequency or nominal carrier frequency).

To transmit an acoustic burst, the microprocessor instructs a selected transmitter to drive the output pins for the ultrasonic transducer, which are coupled to a piezoelectric element PZ. A transformer and/or resonance tuning network may be provided for voltage amplification and control of the transducer's resonant frequency. The transmitters may accept a carrier frequency signal from the oscillator with a nominal frequency of, e.g., 50 KHz. The transmitter may use the carrier frequency signal to generate a series of AM (amplitude modulated) or chirp pulses, each pulse corresponding to an acoustic burst. An example of a chirp pulse may be a pulse having a frequency swept upward from 7 kHz below the carrier frequency to 7 kHz above the carrier frequency (up-chirp). A down chirp may alternatively be employed, with the frequency being swept linearly downward rather than upward. In some contemplated implementations, the transmitter provides a custom pattern of frequency offsets to the acoustic bursts to serve as a unique signature for that ultrasonic transducer. Frequency offsets may alternatively be employed to support upper or lower sideband operation (above and below the resonance frequency, respectively), enabling multiple transducers to transmit concurrently without interfering with each other.

To receive an acoustic signal, the microprocessor instructs one or both ADCs to digitize the electrical receive signal from the MEMS microphones 308 and/or the piezoelectric element 302. The digitized signals may be provided directly to the DSP for real time processing or buffered in memory for later processing by the DSP or by the ECU. To reduce IO bandwidth requirements, the DSP may implement data compression to reduce the number of bits needed to represent the ZIF IQ data or to represent the magnitude of the baseband signals. To reduce bandwidth requirements even further, the DSP may perform on-chip processing for peak detection and distance estimation. Various suitable processing techniques for detecting reflections of the acoustic burst are known in the art, including co-owned US Patent Publication 2024/0069192 "Motion-compensated distance sensing with concurrent up-chirp down-chirp waveforms", which is hereby incorporated herein by reference.

As the received electrical signals are typically in the millivolt or microvolt range, the receivers $RX_M$, $RX_T$ may include amplifiers to buffer and amplify the signal from the receive terminals. Analog or digital mixers may be included to down convert the receive signals to baseband for further filtering and processing by the DSP. The mixer is in one implementation an in-phase/quadrature (I/Q) digital mixer giving Zero Intermediate Frequency (ZIF) IQ data as its output. (Though the term "ZIF" is used herein, the down converted signal may in practice be a low intermediate frequency or "near-baseband" signal.)

The DSP applies programmable methods to acquire the receive signals and to detect any echoes and measure their parameters such as time-of-flight (ToF), direction of arrival (DoA), duration, and peak amplitude. Such methods may employ threshold comparisons, minimum intervals, peak detections, zero-crossing detection and counting, noise level determinations, and other customizable techniques tailored for improving reliability and accuracy. Notably, the peak detection process itself has variations, with some variations performing rising edge detection, falling edge detection, or detection of the peak maximum. Processing for nearby obstacle detection may be performed entirely in the controller 306 or may be shared with or delegated to an ECU or host processor, which receives certain data via the communications bus as previously described.

Figure 5A:
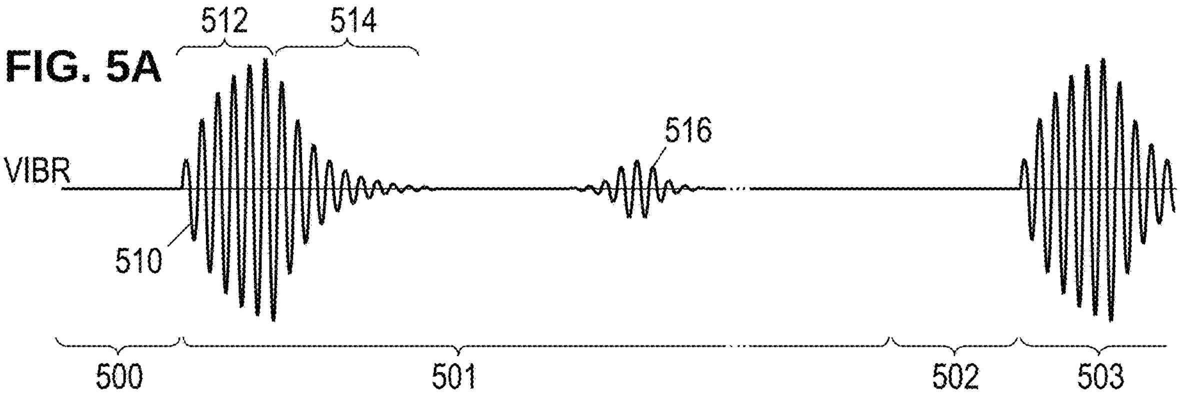
FIGS. 5A-5B are graphs comparing short and long acoustic bursts.

FIG. 5A is a graph representing the vibration VIBR of the piezoelectric element during a typical measurement interval 501. Measurement interval 501 may optionally be separated from preceding and subsequent measurement intervals 503 by inter-measurement intervals 500, 502. The measurement intervals may be periodic, repeating with a fixed cycle period for as long as the sensor is enabled. Alternatively, each measurement interval may be initiated by, e.g., the ECU on an as-needed basis. Each measurement interval begins with the transmission of an acoustic burst 510 having a drive portion 512 where the transmitter supplies a drive current or drive voltage to the ultrasonic transducer and a ringdown portion 514 where the ultrasonic transducer experiences residual vibration. The measurement interval lasts for a predetermined time which may be set or adjusted based on a desired sensing range. If the acoustic burst reflects from an object in the sensing range, the reflected acoustic burst energy causes the ultrasonic transducer to vibrate with delayed echo 516. The echo's delay corresponds to the distance of the object. Multiple objects can cause multiple echoes, each having a delay corresponding to the distance of the corresponding object.

Figure 5B:
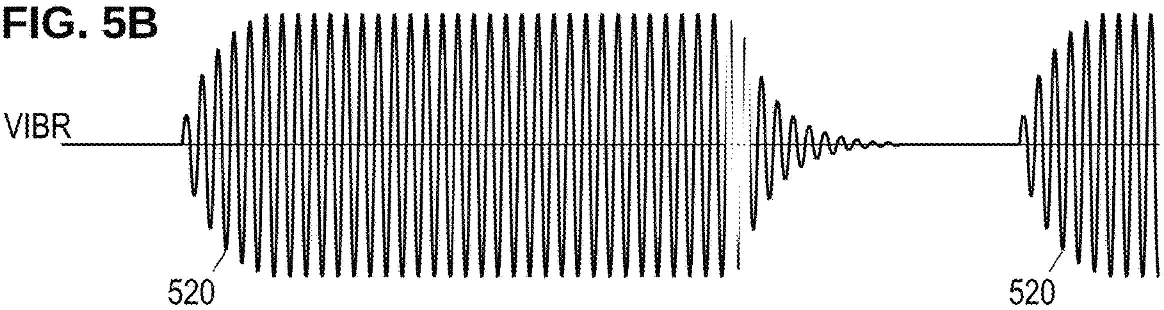

It is noted here that FIGS. 5A and 5B are not drawn to scale. In a typical measurement interval, the acoustic burst's driven portion 512 may extend for 400 microseconds (about 20 cycles of a 50 kHz signal) for AM signaling mode or 2.5 milliseconds (about 125 cycles) for chirp signaling mode. The measurement intervals may be, e.g., 30 to 100 milliseconds, while the optional inter-measurement interval may be a few milliseconds or less or may be long enough to avoid operation during measurement intervals employed by other sensors in the system. With active damping, the acoustic burst's ringdown portion 514 may be no more than a few resonant frequency cycles. The echo amplitude may be less than the acoustic burst amplitude by one or more orders of magnitude.

FIG. 5B is a graph representing the vibration VIBR or the piezoelectric element during a measurement interval when the sensor is in cleaning mode. The acoustic burst 520 is initiated at the beginning of the measurement interval 501 and sustained continuously throughout the measurement interval's duration. The driven portion of the acoustic burst may in some cases be sustained throughout the measurement interval such that the ringdown portion occurs during the inter-measurement interval. In other implementations, the driven portion terminates shortly before the end of the measurement interval 501 so that the residual vibration drops below a threshold before the end of the measurement interval, maximizing the sensor's readiness to return to normal operation in the subsequent measurement interval. Similar readiness can be achieved by further shortening of the acoustic burst to around 50% of the measurement interval to allow echo energy to subside prior to the subsequent measurement interval, but in systems employing sideband or chirp signaling, such shortening may be unnecessary. The sensor controller may maximize the vibration amplitude of the piezoelectric element during the acoustic burst 520 to maximize displacement of any dust, dirt, mud, water, or other obstructions impairing sensor operation. As part of maximizing vibration, the sensor controller may apply the maximum rated drive current or drive voltage levels and may operate at the ultrasonic transducer's resonant frequency while in cleaning mode.

While in cleaning mode, the sensor controller may further operate to maximize energy dissipation and heating of the sensor within each measurement interval. Experiments suggest that such is achieved by maximizing acoustic burst duration and the associated current flow in the transmitter that drives the ultrasonic transducer. With a drive current of about 400 mA and repeated 50 ms measurement intervals in a measurement mode with 2.5 ms acoustic chirps, the sensor controller attained a 7° C. temperature increase after 20 seconds, which translated into a 2° C. temperature increase on the surface of a sealed sensor assembly. This was a proof of concept. In a subsequent test employing 50 ms acoustic bursts at resonance frequency using 300 mA, 400 mA, and 500 mA drive currents, the sensor controller attained a 26° C., 27° C., and 32° C. temperature increase above ambient (25° C.) after 20 seconds, translating into 3° C., 5° C., and 7° C., surface temperature increase respectively. Such energy dissipation within the controller facilitates melting and clearing of snow and ice from the sensor surface without necessitating a dedicated heating element.

In sensors having proximate microphone ports, the piezoelectric element vibration and sensor controller heating can operate to clear obstructions from the microphone ports as well as from the surface of the piezoelectric element. It may be preferred to limit the acoustic bursts 520 to the associated measurement intervals to facilitate autonomous switching between cleaning and measurement modes.

Figure 6:
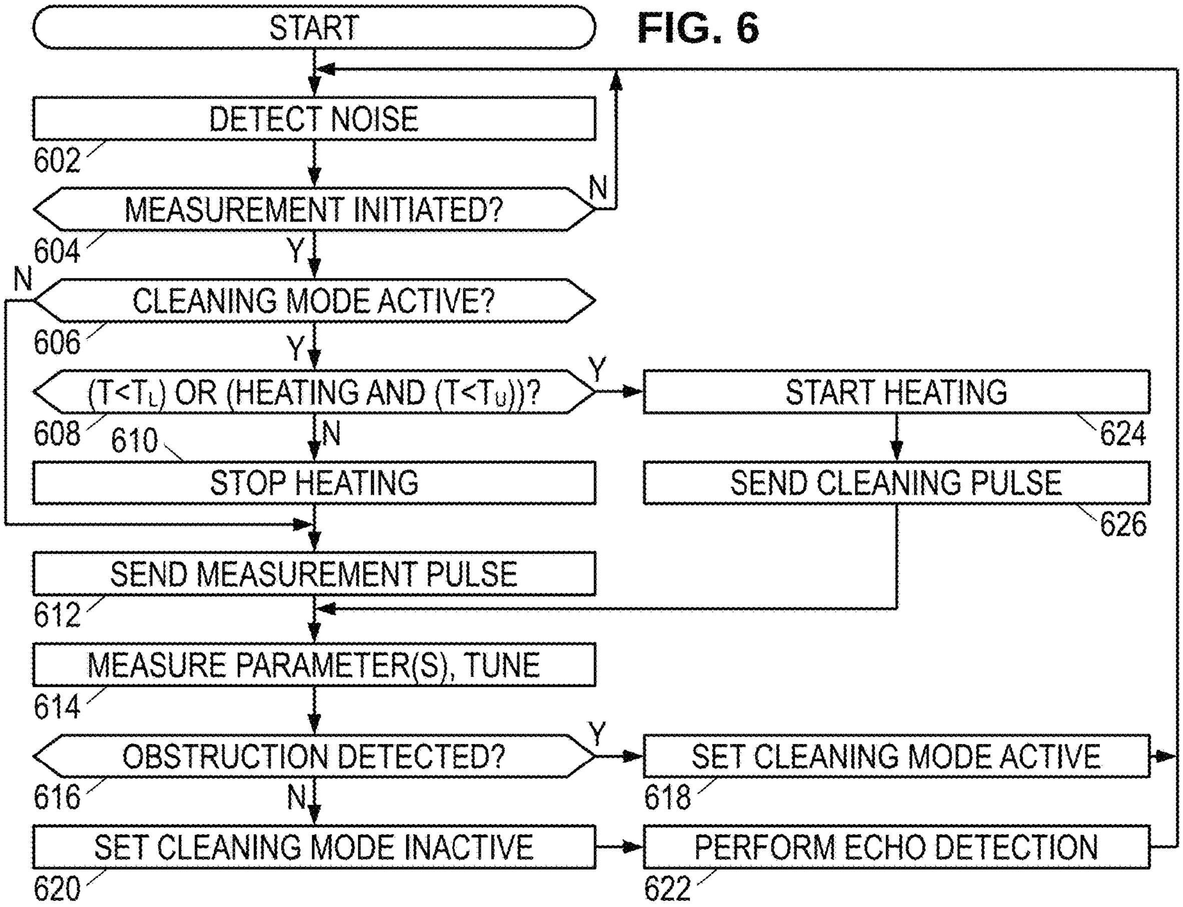
FIG. 6 is a flow diagram of an illustrative sensing method.

FIG. 6 is a flow diagram of an illustrative sensing method that may be implemented by a sensor controller. In blocks 602 and 604, the sensor controller performs noise level detection while waiting for the initiation of a measurement interval. The measurement intervals may be initiated by a command, e.g., from the ECU, and/or periodically initiated by, e.g., an internal timer. When the measurement interval is initiated, the sensor controller checks in block 606 whether the cleaning mode is active. In some implementations the sensor controller may have a bit set in a status register to indicate when the cleaning mode is active, and the bit may be cleared when the sensor is in a normal operating mode. If the sensor is in a normal operating mode, the sensor controller may proceed to block 612 to generate a short acoustic burst for object detection and distance measurement.

Otherwise, the sensor controller performs a temperature check in block 608. A dedicated thermocouple or other external temperature sensor may be used, but in at least some contemplated embodiments the sensor controller measures an internal PN junction temperature. The junction temperature can be measured indirectly by measuring the voltage of a current-biased diode or transistor, or by measuring current through a voltage-biased diode or transistor. Various temperature-compensated voltage- and current-reference circuits are known in the literature which can be readily adapted to provide a temperature measurement signal derived from their temperature-compensating elements. The sensor controller may compare the temperature measurement to an upper temperature threshold $T_U$ and a lower temperature threshold $T_L$. The sensor controller may further maintain a heating status bit to indicate whether the sensor controller temperature is being intentionally raised or being allowed to cool. If junction temperature is cold (below the lower threshold $T_L$) or if the junction temperature is medium (between the upper and lower thresholds) and the heating status bit is set, the sensor controller proceeds to block 624.

Otherwise, in block 610, the sensor controller clears the heating status bit and proceeds to block 612. In block 612, the sensor controller generates a short pulse to detect objects and measure distances. In block 614, the sensor controller may measure one or more transducer response parameters to sense the piezoelectric transducer state using any suitable method such as those outlined in previously mentioned U.S. Pat. No. 11,269,067 ("Response-based determination of piezoelectric transducer state"). The sensor controller may dynamically adjust the acoustic burst waveform based on the one or more parameters to, e.g., track the ultrasonic transducer resonance frequency.

In block 616, the sensor controller may check to determine whether the sensor is obstructed. As discussed in the reference patent, snow, ice, water, mud, or other materials may coat the surface of the sensor and in so doing significantly affect the transducer response. Where such materials obstruct microphone ports, the obstruction may be detected as a significant attenuation of the acoustic burst relative to a default state. If such obstructions are detected, the sensor controller may set the cleaning mode bit in the status register in block 618 before returning to block 602. Otherwise, in block 620, the sensor controller may clear the cleaning mode status bit to enable normal sensor operation. In block 622, the sensor controller may perform signal processing to detect echoes, determine associated distances, and report the measurements to the ECU before returning to block 602.

If, in block 608, the sensor controller has verified that the cleaning mode is active and heating is desired, the sensor controller sets or maintains the heating status bit in block 624. In block 626, the sensor controller generates a long acoustic burst to maximize vibration and/or energy dissipation during the current measurement interval. In block 614, the sensor controller may monitor the transducer response to determine whether the sensor remains obstructed.

The foregoing sensors, controller, and methods, enable self-cleaning functionality that reduce the vulnerability of ultrasonic sensors to obstructions without significantly increasing manufacturing costs, enhancing their desirability as short-range backup sensors for use in camera-based systems. The self-cleaning extends beyond the piezoelectric element to enable cleaning of nearby microphones and microphone ports in 3D ultrasonic sensors. The self-cleaning functionality does not require additional components that might otherwise increase manufacturing costs, such as a dedicated heating element, seperate vibration element, or a frame designed to couple ultrasonic element vibrations into the sensor's holder. The internal temperature monitoring enables self-cleaning without causing undue temperature stress in the piezoelectric element that might otherwise degrade sensor performance and shorten the service life of the sensor. The sensor can autonomously diagnose the need for self cleaning and perform the self cleaning autonomously but can alternatively perform such actions when triggered by the ECU. With the acoustic bursts being confined to measurement intervals, the self-cleaning functionality can remain transparent to the operations of other sensors in the system.

In a typical ultrasonic sensor, the duration of a single measurement interval may be about 50 ms, which provides a sensing range of about 6.5 m. If operating in chirp mode, the acoustic burst may be limited to no more than about 2.5 ms, or about 450 microseconds if operating in amplitude modulation mode. As a proof of concept, heat map imaging of a piezo-based ultrasonic sensor and of the integrated circuit controller chip demonstrate that 2.5 ms chirp measurements repeated at 50 ms intervals for about 20 seconds cause enough heat dissipation to raise the chip temperature by 7° C. and to raise the sensor membrane temperature by about 2° C. In these experiments, the transmit current driven by the chip was 400 mA.

In one implementation, the sensor controller employs vibrations to remove dirt from piezo membrane without any special requirements on piezo holder design. To do this, the piezo transducer can be driven at resonance frequency with a continuous burst (amplitude modulation mode) for the full measurement duration (~50 ms). This maximizes transducer vibrations to ensure highest possible efficiency of dirt removal from piezo membrane, achieving the highest possible sound pressure level (SPL).

In one implementation the sensor controller employs energy dissipation to heat the sensor without a separate heater and without extensive temperature stressing of the piezoelectric element. To do this, the piezo transducer can be driven at resonance frequency (to maximize efficiency of energy transfer between piezo and air) at a relatively high drive current (greater than or equal to about 400 mA). Current level is programmable and may be adapted. A high driving current leads to high dissipation on-chip, ensuring overall senor temperature increase. Since the chip temperature is the heat source, we can use an on-chip junction temperature to monitor the heating process. Thus, the cleaning sequence may provide a series of measurement intervals each containing a continuous AM burst, pausing the series when the junction temperature T exceeds an upper temperature threshold. The upper temperature threshold is preferably configurable. The series may resume when the junction temperature falls below a lower temperature threshold, which may also be configurable.

In one implementation, the cleaning operations are performed autonomously. To enable the ultrasonic sensor to perform autonomous cleaning, the integrated circuit control chip may detect when the sensor is obstructed, preferably without direct involvement of the ECU or any interruption of an on-going measurement sequence. While the sensor is obstructed, the control chip may inform the ECU that the measurement data should be ignored as long as the sensor remains obstructed and may initiate continuous amplitude modulated acoustic bursts during otherwise unused measurement intervals to automatically clear the obstruction.

In one implementation, the sensor controller can (automatically or when instructed by ECU) detect sensor obstructions and faults while performing measurements. Techniques for doing such detection are described in, e.g., U.S. Pat. No. 11,269,067 ("Response-based determination of piezoelectric transducer state"). Illustrative techniques may be based on measurements of driven response or reverberation decay. Measurements such as decay time, reverberation period, transducer signal phase & magnitude, can be used for such diagnostics. If it has determined that the membrane is covered by dirt or ice, the sensor controller can activate cleaning mode using long acoustic bursts that fully occupy each measurement interval, i.e., bursts that are continuous throughout substantially all of each measurement interval at 400 mA drive current at resonant frequency with shaping to minimize crosstalk with other unobstructed sensors employing dual channel operation. Shaping and current level may be configurable to further limit such crosstalk. Frequency may also be configurable for this purpose. The ECU may configure whether the automatic/autonomous sensor cleaning mode is enabled or disabled for each sensor.

Measurement data may be captured for each measurement interval including intervals when the cleaning mode is active. A status bit may be used to report a cleaning_active status to the ECU along with measurement results from the sensor. If the sensor controller detects that the sensor has become unobstructed, the status bit will be cleared, and the cleaning mode terminated.

If the sensor control chip detects junction temperature T greater than the upper temperature threshold while the cleaning_active status bit is high, the long acoustic bursts may be discontinued until the control chip detects a junction temperature T below the lower temperature threshold, at which point if the cleaning_active status bit is high the long acoustic bursts are resumed.

In contemplated systems that employ dual channel sensing, the unobstructed sensors in the system should be able to continue normal operations while a given sensor is performing self cleaning. Normal measurements operate at side frequencies and not at the resonant frequency, and accordingly are not expected to suffer interference from an obstructed sensor's cleaning operations with shaped and current-limited beaming at the resonant frequency. Additional information regarding dual channel operation can be found in, e.g., U.S. application Ser. No. 15/888,471, filed 2018 Feb. 5 and titled "Composite Acoustic Bursts for Multi-channel Sensing", which is hereby incorporated herein by reference.

Heat maps for testing at ambient temperature (24.8 C) show that after 20 seconds of operation in the above-described cleaning mode with drive currents of 300 mA, 400 mA, and 500 mA, the center of the sensor membrane reached 28.0 C, 30.1 C, and 30.7 C, respectively. Corresponding regions of the control chip reached 50.7 C, 51.9 C, and 57.0 C, respectively. In normal operating mode, the chip temperature was measured at 31.6 C. Experiments demonstrated efficient melting of a thin layers of frost on a sensor membrane.

The class of ultrasonic sensors includes not only traditional send-receive piezoelectric transducers, but also 3D ultrasonic sensors that measure not only a reflector's distance but also its azimuth and elevation relative to the sensor. Such 3D sensors may employ an arrangement of microphones closely spaced (on the order of a half wavelength) to each other and to the piezoelectric transducer. Such microphones may be implemented using microelectromechanical systems (MEMS) technology. Obstruction of the sensor may take the form of mud, water, ice, dirt, etc. on the piezoelectric transducer membrane or plugging one or more of the ports for the microphones. So long as obstruction of the microphone ports can be detected, the previously described cleaning mode can be applied to remove those obstruction because the ports are positioned near to the piezoelectric transducer and experience comparable levels of vibration and heating.

In 3D ultrasonic sensors, the acoustic bursts transmitted by the piezoelectric transducer couple to the MEMS microphones as crosstalk. This crosstalk can be captured for each microphone and compared to the crosstalk expected for an unobstructed sensor. If crosstalk changes are detected without detection of piezoelectric membrane loading, such changes are indicative of obstruction of the corresponding microphone. Thus, for 3D ULS, the operating method may include: (1) Ultrasonic beaming (i.e., transmitting an acoustic burst); (2) Capturing and analyzing the crosstalk signal from ultrasonic beaming for each MEMS microphone; (3) Evaluating phase, frequency and envelope of the cross-talk signal to diagnose MEMS obstruction by dirt (MEMS+cover+dirt creating a complex resonator); and (4) Upon detecting an obstructed MEMS microphone, enabling self-cleaning mode to perform continuous amplitude modulated beaming during each measurement interval for as long as MEMS obstruction is detected. Beaming current and frequency are programmable and may be optimized to maximize efficiency of MEMS microphone cleaning and to limit MEMS stress (both temperature and mechanical stress).

Because heated air rises, the piezoelectric transducer and sensor controller should be located below the MEMS microphone in the same module, enabling the piezo and controller to work as a heater while providing "high pressure" waves to clear the microphone port hole. The bursts from the piezo also enable the MEMS to monitor the crosstalk signal to determine when the obstruction has been cleared.

We note here that microphones operating as audio sensors (e.g., for siren detection) may be co-packaged with piezoelectric transducers to enable obstruction detection and to enable self cleaning. The audio sensors may continue to operate to detect signals in the audio band even while the piezoelectric transducer is operated in the ultrasonic band to enable obstruction detection and self cleaning of the audio sensor. The sensor controller chip may perform processing in both an audio channel (filtering out frequencies above 20 kHz) and an ultrasonic channel (filtering out frequencies below 30 kHz and above 90 kHz). Such sensors may be described as "self cleaning MEMS microphones". The self-cleaning feature can be implemented for ultrasonic sensors, 3D ultrasonic sensors, and MEMS microphones, without direct involvement of the ECU and without requiring reconfiguration of the system measurement sequence. These sensors can thus be equipped with this feature as a standalone safety mechanism.

Some contemplated embodiments may include one or more of the following features: 1. Shaped amplitude modulated beaming at transducer's resonant frequency during complete measurement interval (~50 ms) for cleaning of an obstructed sensor-normal operations of properly operating sensors are not impacted/blocked by the obstructed sensor's cleaning operations. 2. Beaming frequency and beaming current are configurable and may be set so as to minimize the crosstalk into high/low channels of other sensors (dual channel chirp mode may be preferred to help reduce crosstalk between the long acoustic bursts used for cleaning and the short acoustic chirps used for measurement). 3. In cleaning mode, the ultrasonic transducer may be driven at its resonance frequency to maximize SPL and thereby optimize ultrasonic cleaning. 4. The sensor's self-cleaning functionality may be autonomously activated based upon ultrasonic transducer and/or MEMS microphone diagnostic results. MEMS microphone diagnostics may employ phase-based, decay-time based, frequency-based, or envelope-based analysis of the crosstalk signal from the piezoelectric transducer. 5. Sensor cleaning is performed without modifying or interrupting the system's on-going measurement sequence. Such interruptions could undesirably halt system level operations (e.g., park assistance), whereas reporting of an obstructed sensor while self-cleaning occurs may enable normal operation to continue while relying on the fully functional unobstructed sensors. 6. The sensor may perform self cleaning of both the piezoelectric element cover and the MEMS microphones via ultrasonic wave energy and self-heating of the piezoelectric element and sensor controller chip. 7. The solution may be implemented with existing sensor components and thus may offer a low-cost solution to achieve immunity to adverse weather conditions.

Among the features made possible and more robust by the use of the disclosed ultrasonic sensors with self-cleaning functionality are, for automotive applications: kick to open, park assist, automatic parking, and door protection. Applications are not limited to automotive environments. As an example of an industrial application, the disclosed sensors may be employed for fluid level metering in a harsh environment.

Though the operations shown and described in FIG. 6 are treated as being sequential for explanatory purposes, in practice the method may be carried out by multiple integrated circuit components operating concurrently and perhaps even speculatively to enable out-of-order operations. The sequential discussion is not meant to be limiting. Moreover, the foregoing embodiments may omit complicating factors such as parasitic impedances, current-limiting resistors, level-shifters, line clamps, etc., which may be present but do not meaningfully impact the operation of the disclosed circuits. Still further, the focus of the foregoing discussions has been ultrasonic sensors, but the principles are applicable to any acoustic sensors with operating parameters that may be impaired or affected by transducer loading. These and numerous other modifications, equivalents, and alternatives, will become apparent to those skilled in the art once the above disclosure is fully appreciated. It is intended that the following claims be interpreted to embrace all such modifications, equivalents, and alternatives where applicable.

What is claimed is:

1. A sensor that comprises:

a piezoelectric transducer; and a sensor controller that includes:

a transmitter coupled to the piezoelectric transducer to generate an acoustic burst;

a receiver coupled to at least one of the piezoelectric transducer and a microphone to detect a reflection of the acoustic burst within a measurement interval associated with the acoustic burst, the measurement interval being greater than 50 ms; and a microcontroller configured to control a length of the acoustic burst to be less than or equal to 4 ms when operating to detect the reflection, the microcontroller setting a longer acoustic burst length when operating to clean the sensor, the longer burst length exceeding half of the measurement interval.

2. The sensor of claim 1, wherein the longer burst length fully occupies the measurement interval with driven vibration or residual ringdown vibration.

3. The sensor of claim 1, wherein the transmitter drives the transducer at a resonant frequency for the length of the acoustic burst when operating to clean the sensor, and drives the transducer at above or below the resonant frequency when operating to detect the reflection.

4. The sensor of claim 1, wherein the transmitter drives the transducer with a drive current greater than or equal to 400 milliamps when operating to clean the sensor.

5. The sensor of claim 1, wherein the microcontroller employs the longer acoustic burst length for multiple consecutive measurement intervals when operating to clean the sensor.

6. The sensor of claim 1, wherein when operating to clean the sensor, the microcontroller repeatedly employs the longer acoustic burst length until the sensor controller reaches a temperature threshold.

7. The sensor of claim 6, wherein when operating to clean the sensor, the microcontroller resumes employing the longer acoustic burst length after the sensor controller returns from the temperature threshold to a lower temperature threshold.

8. The sensor of claim 6, wherein the sensor controller heats a microphone port to clear away ice.

9. The sensor of claim 1, wherein when operating to clean the sensor the sensor controller heats the piezoelectric transducer without relying on a heater.

10. The sensor of claim 1, wherein the microcontroller is configured to monitor for sensor impairment and is configured to automatically begin operating to clean the sensor after detecting sensor impairment.

11. A method implemented by a sensor controller for a sensor, the method comprising:

driving a piezoelectric transducer to generate a short acoustic burst for obstacle detection or distance measurement, the short acoustic burst having a length less than or equal to 4 ms;

obtaining a receive signal to monitor for reflections of the short acoustic burst within a measurement interval associated with the short acoustic burst, the measurement interval being greater than 50 ms; and operating to clean the sensor by driving the piezoelectric transducer to generate a long acoustic burst at a resonant frequency of the piezoelectric transducer, the long acoustic burst having a length exceeding half of the measurement interval.

12. The method of claim 11, wherein the sensor implements a series of sequential measurement intervals, and wherein the long acoustic burst occupies a full measurement interval with driven vibration or residual ringdown vibration.

13. The method of claim 11, wherein the short acoustic burst drives the piezoelectric transducer at a frequency above or below the resonant frequency.

14. The method of claim 11, wherein said driving the piezoelectric transducer is performed with a drive current greater than or equal to 400 milliamps when operating to clean the sensor.

15. The method of claim 12, wherein as part of said operating to clean the sensor, the method includes repeatedly generating the long acoustic burst until the sensor controller reaches a temperature threshold.

16. A sensor controller that comprises:

a transmitter configured to drive a piezoelectric transducer to generate an acoustic burst;

a receiver coupled to at least one of the piezoelectric transducer and a microphone to detect a reflection of the acoustic burst within a measurement interval associated with the acoustic burst, the measurement interval being greater than 50 ms; and a microcontroller configured to control a length of the acoustic burst to be less than or equal to 4 ms when operating to detect the reflection, the microcontroller setting a longer acoustic burst length when operating to clean the sensor, the longer burst length exceeding half of the measurement interval.

17. The sensor controller of claim 16, wherein the microcontroller is configured to monitor for sensor impairment and is configured to automatically begin operating to clean the sensor after detecting sensor impairment.

18. The sensor controller of claim 17, wherein when operating to clean the sensor, the microcontroller repeatedly employs the longer acoustic burst length to reach and maintain an elevated temperature for the sensor controller while the sensor impairment remains.

* * * * *